Oct. 8, 1929. J. B. HAWLEY, JR Re. 17,452

TIE ROD

Original Filed Sept. 2, 1924 2 Sheets-Sheet 1

Witness
William P. Kilroy

Inventor
John B. Hawley Jr.
By Hill & Hill Attys.

Oct. 8, 1929.

J. B. HAWLEY, JR

Re. 17,452

TIE ROD

Original Filed Sept. 2, 1924 2 Sheets-Sheet 2

Witness
William P. Kilroy

Inventor
John B. Hawley Jr.
By Hill & Hill
Attys.

Reissued Oct. 8, 1929

Re. 17,452

UNITED STATES PATENT OFFICE

JOHN B. HAWLEY, JR., OF MINNEAPOLIS, MINNESOTA, ASSIGNOR, BY DIRECT AND MESNE ASSIGNMENTS, OF ONE-HALF TO GOODSPEED INVESTMENT COMPANY, OF GRAND RAPIDS, MICHIGAN, AND ONE-HALF TO CHESTER I. WILLIAMS, OF GRAND RAPIDS, MICHIGAN

TIE ROD

Original application filed September 2, 1924, Serial No. 735,247. Divided and application filed March 13, 1926, Serial No. 94,422. Original No. 1,667,252, dated April 24, 1928. Application for reissue filed June 17, 1929. Serial No. 371,598.

My present invention provides an extremely simple and highly efficient tie rod or bolt especially adapted for use in the construction of monolithic concrete walls, and, generally stated, the invention consists of the novel devices and combinations of devices hereinafter described and defined in the claims.

The present application is filed as a division of my pending application Serial Number 735,247 which issued as Patent #1,586,991 and which application is directed to the improved method or process of applying and using tie rods in erecting concrete structures. Simplicity of construction, efficiency in use and rapidity and ease of manipulation, both in the application of the rods to the concrete forms and the removal thereof from the forms and the wall, are the main objects of the invention. To accomplish these obects, and more particularly the last noted, requires that the tie rods be capable of application to the forms entirely from the exterior thereof and without requiring any manual manipulation applied between the walls of the forms.

In accomplishing the above objects and other important but minor objects I provide a tie rod that is made up of three main sections or elements, to wit: two end sections and an intermediate section; the end sections being of greater diameter than the intermediate section. The end sections are externally threaded at their outer ends and internally threaded at their inner ends while the intermediate or central section, which is of relatively small diameter, is externally threaded at its ends and its ends are adapted to be screwed into the internally threaded ends of the end sections. Nuts are applied to the threaded outer ends of the outer sections.

The tie rod or bolt of the character just indicated is of simple construction and in use has highly desirable features as will hereinafter appear more fully after having first described the invention as illustrated in the accompanying drawings wherein like characters indicate like parts throughout the several views.

Referring to the drawings.

Figure 1:
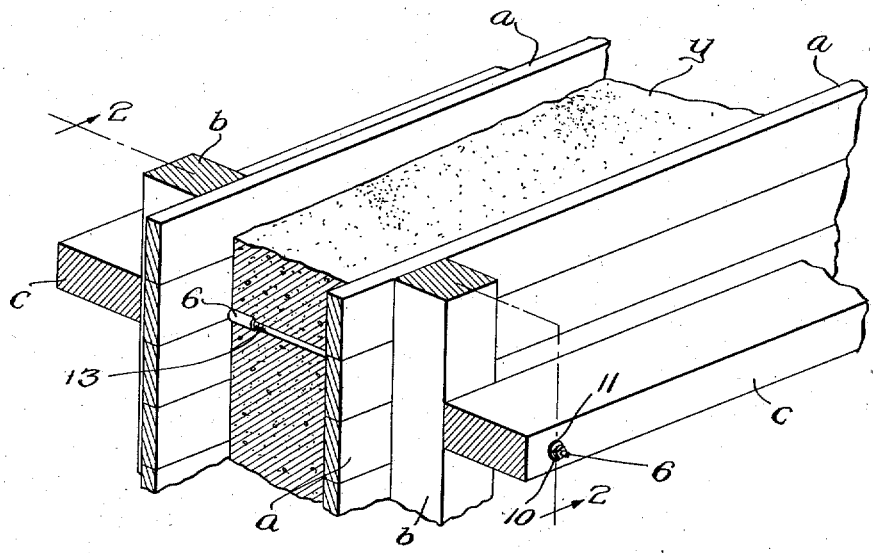
Fig. 1 is a fragmentary perspective showing a portion of a concrete wall form and a portion of a monolithic concrete wall formed between the same.
Figure 2:
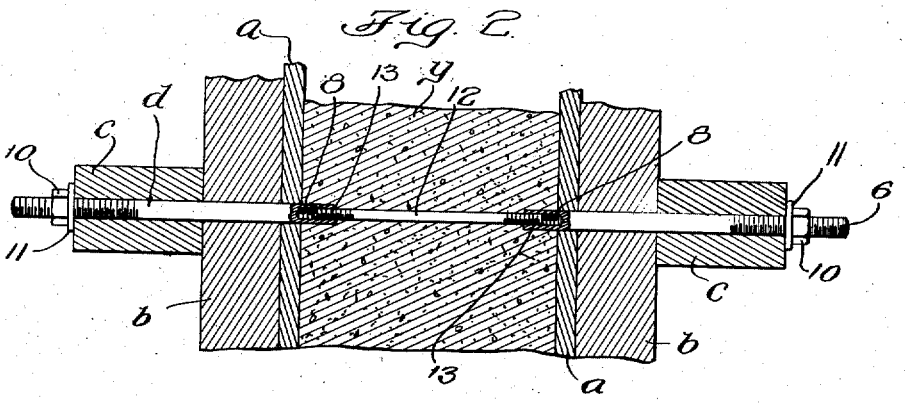
Fig. 2 is a fragmentary vertical section taken on the line 2—2 of Fig. 1.
Figure 5:
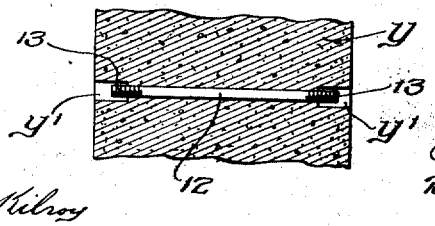
Fig. 5 is a fragmentary section taken on the same line as Fig. 2 but showing only a portion of the concrete wall with the form removed and with the central or intermediate section of the tie rod left in the wall.

Of the parts of the improved tie rod, the numeral 6 indicates the end sections, the outer ends of which are externally threaded at 7, and the inner ends of which are internally threaded at 8, and preferably also internally beveled at 9. Nuts 10 and preferably also washers 11 are applicable to the threaded outer ends of the sections 6. The intermediate or central section 12 is of considerably less diameter than the end sections 6 and the threaded ends 13 thereof are adapted to be freely screwed into the internally threaded ends 8 of said sections 6.

Figure 3:
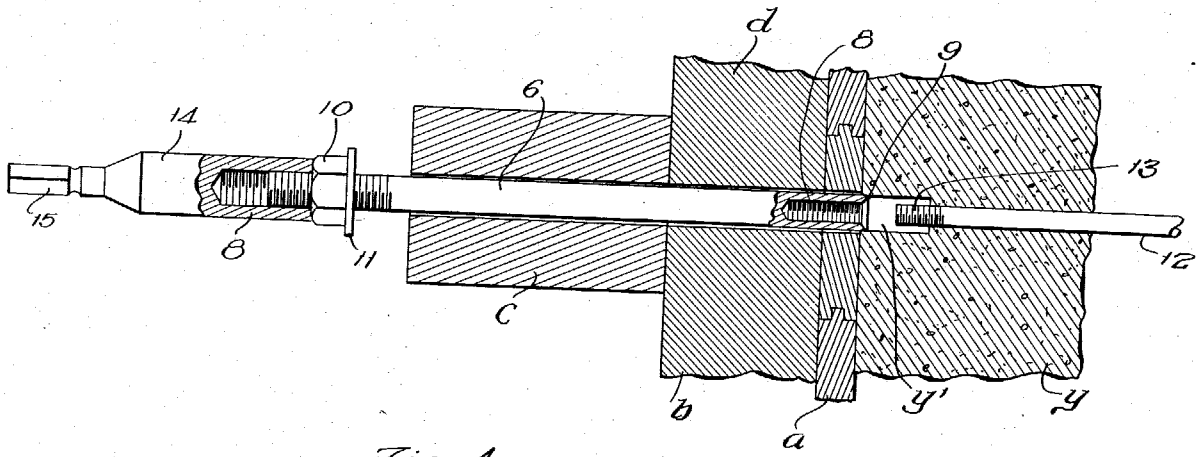
Fig. 3 is a fragmentary view in section on the same line as Fig. 2, but showing only one side of the form, a portion of the concrete wall, and one end of the tie rod, the sections thereof being separated and some parts being shown in full.

In Fig. 3 there is shown a tool in the form of an internally threaded socket 14 that is adapted to be screwed onto the outer end of either section 6 and is provided with an annular outer end shank 15, and the purpose of which tool will be hereinafter noted.

The concrete form, which is of the usual c any suitable construction, is, as shown, made up of wall-forming boards *a*, vertical beams *b* and horizontal beams *c*. The concrete wall is indicated by the character *y*. These walls are, of course, to be properly spaced by the tie bolts; that is, by the tie bolts they will be properly held against separation and the tie bolts will take the strain of the slushed-in concrete.

At points where the tie rods are to be applied the wall boards *a* and beams *b* and *c* are formed with aligned holes or passages *d* that are preferably only slightly greater in diameter than the outer rod sections 6.

The intermediate or central rod section 12 should be somewhat shorter, say about two inches shorter, than the thickness of the wall to be formed so that in the formed wall the ends will not project from the surface of the wall and hence will not have to be cut off.

Figure 4:
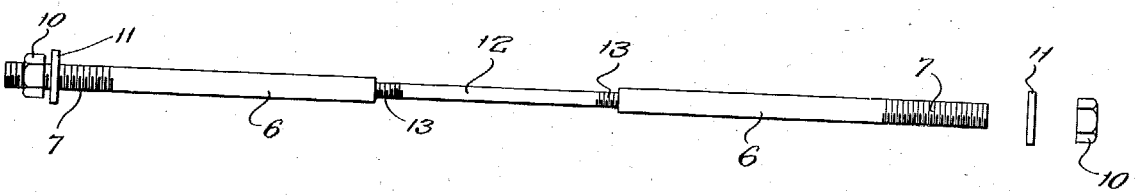
Fig. 4 is a plan view of the tie rod in condition to be applied in working position through the walls of the concrete form.

Before the rods are applied to the form it is preferable to assemble the rods by screwing the sections 6 onto section 12 substantially as shown in Fig. 4 with the threaded ends 13 of the section 12 seated far enough within the internally threaded ends of the sections 6 to withstand the pressure from the soft concrete wall. The rods, as thus assembled, may be freely slipped into position and passed through both sides of the wall form by a simple end-wise movement thereof through the aligned holes *d*. When the central section has been properly positioned, the nuts on the ends of the outer sections 6 and the washers 11 will be tightened against the sides of the wall form and they will then properly hold the forms against spreading or separation.

After the wall has set and hardened so that it is safe to remove the wall forms the outer rod sections 6 may be screwed from the central section 12 and withdrawn from position, leaving the section 12 embedded in the concrete with its ends countersunk into recesses *y'*.

It will be the usual practice to leave the central or intermediate rod sections 12 in the formed concrete wall. This does not incur much expense because these intermediate sections 12 are small rods of simple construction and in fact for most purposes are only large wires and will not cost more than the wires usually left in walls, and they have the further advantage that they do not have to be cut off at the outer surface of the wall. The recesses *y'* may be easily filled or plugged with cement. Usually the end sections 6 can be very easily screwed off from the anchored central section 12 but if they should be somewhat stuck by the concrete they may be easily loosened and turned off by the application of a socket wrench 14 screwed against the adjacent nuts. The end sections 6, nuts and washers will, of course, be used over and over again, and that fact is of importance because they are the only parts of the complete rod whose cost of production is a matter of any particular consideration. The concave or internally beveled ends 9 serve to guide the fitted ends 13 of the rod section 12 into the threaded seats 8.

Attention is again called to the importance of the arrangement wherein the central or intermediate rod sections 12 are of smaller diameter than the end sections 6 and are in fact simply straight rods or heavy wire sections with threaded ends. The bolt holes or passages in the forms should not be of much greater diameter than the rod sections 6 for otherwise the applied rods would not be properly positioned and, moreover, there would be a leakage of concrete around the same; and if the central sections 12 have any parts of greater diameter than the end sections 6 then the assembled bolt could not be inserted to position from the outer side of the form and some sort of manual manipulation would have to take place within the form or straight sides thereof and this latter indicated operation would render the tie bolts impractical for use. Moreover, since the rod sections 12 in the ordinary use thereof would be left in the wall they should be of the simplest form and least possible cost, or in other words, should be of the structure and arrangement described and illustrated in the drawings.

The advantages in the use of this improved tie rod or bolt may be summed up as follows:

The elements of the bolt proper may be assembled at the bench or elsewhere, ready for placing; requires no manipulation between the walls of the forms; leaves nothing but a small rod in the wall; the main elements of the rods are used over and over again; requires no cutting back of the concrete; draws the forms to proper alignment; gives positive known strength and no bulging of the walls due to slipping or stretching; holes left in walls are easily plugged or plastered up; makes a water-tight wall; rod section left in wall cost approximately same as tie wires; gives endwise adjustment; can be removed any time after wall is set and even weeks after wall is set; can be removed with lock nuts or special wrenches; does not damage forms and allows forms to be used over and over again without destruction; the rod sections left in the wall will afford good anchors in cases where brackets or the like are to be secured to the surface of the completed concrete wall. As is evident the nuts 10 on the outer ends of the rod sections *d* constitute one form of form stop, the said stops being adjustable axially or longitudinally on the said rod sections.

What I claim is:

1. A tie rod for insertion through prepared concrete forms, made up of outer end and intermediate rod sections, the outer end sections being of substantially uniform diameter throughout, the inner section having a diameter not greater than the outer end section diameter and having externally threaded ends, the outer end sections having internally threaded ends to engage the threaded ends of the intermediate rod, and adjustable form stops for the outer rod sections.

2. A tie rod for insertion through prepared concrete forms, made up of outer end and intermediate rod sections, the outer end sections being of substantially uniform diameter throughout, the inner section having a diameter not greater than the outer end section diameter and having externally threaded ends to engage the threaded ends of the intermediate rod and externally threaded ends, and nuts applied to the externally threaded ends of the outer rod sections.

3. In combination, spaced apart concrete forms, a tie rod for insertion therein, made up of outer end and intermediate rod sections, the outer end sections being of substantially uniform diameter throughout, the inner section having a diameter not greater than the outer end section diameter and having externally threaded ends, the outer end sections having internally threaded ends to engage the threaded ends of the intermediate rod, and adjustable form stops for the outer rod sections.

4. In combination, spaced apart concrete forms, a tie rod for such forms comprising cooperating outer end and intermediate rod sections, the outer end sections being of substantially uniform diameter throughout, the intermediate section having a diameter not greater than that of the outer end sections, the inner ends of the outer sections each having a socket adapted to receive one end of the intermediate section, means operable upon relative rotation of the outer end and intermediate sections to detachably fasten said sections together, and adjustable form stops for the outer rod sections.

5. In combination, spaced apart concrete forms, a tie rod for such forms comprising cooperating outer end and intermediate rod sections, the outer end sections being of substantially uniform diameter throughout, the intermediate section having a diameter not greater than that of the outer end section and having externally threaded ends, the outer end sections having internally threaded end sockets operable to engage the threaded ends of the intermediate rod section, and adjustable form stops for the outer rod sections.

In witness whereof, I hereunto subscribe my name this 26th day of July, A. D. 1929.

JOHN B. HAWLEY, Jr.